United States Patent
Yabune (10) Patent No.: US 9,796,547 B2
(45) Date of Patent: Oct. 24, 2017

(54) CONVEYANCE CONTROL DEVICE

(71) Applicant: RISO KAGAKU CORPORATION, Tokyo (JP)

(72) Inventor: Hirokazu Yabune, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/404,572

(22) Filed: Jan. 12, 2017

(65) Prior Publication Data

US 2017/0217706 A1    Aug. 3, 2017

(30) Foreign Application Priority Data

Jan. 29, 2016    (JP) .................. 2016-015162

(51) Int. Cl.
| | | |
|---|---|---|
| *B65H 7/12* | (2006.01) | |
| *B65H 7/14* | (2006.01) | |
| *H04N 1/00* | (2006.01) | |

(52) U.S. Cl.
CPC ............. *B65H 7/14* (2013.01); *B65H 7/12* (2013.01); *B65H 7/125* (2013.01); *H04N 1/00734* (2013.01); *H04N 1/00755* (2013.01); *B65H 2511/411* (2013.01); *B65H 2511/413* (2013.01); *B65H 2511/512* (2013.01);
(Continued)

(58) Field of Classification Search
CPC . B65H 7/125; B65H 7/12; B65H 7/14; B65H 7/06; B65H 2511/524; B65H 2511/512; B65H 2511/514; B65H 2511/411; B65H 2511/413; B65H 2553/40; B65H 2553/41; B65H 2553/412; B65H 2553/414; B65H 2553/416
See application file for complete search history.

(56) References Cited

U.S. PATENT DOCUMENTS

| | | | | |
|---|---|---|---|---|
| 5,067,704 | A | * | 11/1991 | Tsuihiji ................ B65H 7/125 271/256 |
| 7,519,213 | B2 | * | 4/2009 | Klock ................... B65H 7/125 250/559.11 |

(Continued)

FOREIGN PATENT DOCUMENTS

| | | | |
|---|---|---|---|
| JP | 9-208087 | | 8/1997 |
| JP | 2000095391 | A * | 4/2000 |
| JP | 2014105088 | A * | 6/2014 |

*Primary Examiner* — Luis A Gonzalez
(74) *Attorney, Agent, or Firm* — Greenblum & Bernstein, P.L.C.

(57) ABSTRACT

A conveyance control device controls conveyance of a plurality of sheets including an image-formed sheet. The conveyance control device includes an obtaining unit configured to obtain display image data indicating a display image of each of the plurality of sheets; a region-specifying unit configured to specify common color regions having a common display color on the plurality of sheets based on the display image data; and a multiple feed detector configured to detect multiple feed of the sheets based on a light-receiving amount of light irradiated onto the common color regions; wherein the display image data indicating a display image of the image-formed sheet includes predetermined image data indicating a predetermined image to be previously formed and sheet image data indicating a sheet image displayed in a sheet color of the sheet.

1 Claim, 5 Drawing Sheets

(52) U.S. Cl.
CPC .... *B65H 2511/524* (2013.01); *B65H 2553/00* (2013.01); *B65H 2553/40* (2013.01); *B65H 2553/412* (2013.01)

(56) References Cited

U.S. PATENT DOCUMENTS

| | | | | |
|---|---|---|---|---|
| 7,654,521 B2* | 2/2010 | Simonis | ............... | B65H 7/125 271/258.01 |
| 7,891,663 B2* | 2/2011 | Tsuruoka | ............... | B65H 7/12 271/259 |
| 8,567,776 B2* | 10/2013 | Niwano | ............... | B65H 7/125 271/262 |

\* cited by examiner

CONVEYANCE CONTROL DEVICE

BACKGROUND

1. Technical Field

The present invention relates to a conveyance control device controlling conveyance of sheets.

2. Related Art

Japanese Patent Application Publication No. 09-208087 that is a patent literature discloses, as an image forming apparatus that forms an image on a sheet, a conveyance control device having a function of detecting a state in which a plurality of sheets is transferred in an overlapped state when sheets are transferred (so-called multiple feed).

In the conveyance control device of this type, a light-emitting element and a light-receiving element that are optical sensors are disposed to face each other across a transfer passage of sheets, and detect multiple feed based on change of a light-receiving amount by the light-receiving element.

Specifically, with reference to an amount of light passing through the sheet when only a normal one sheet is transferred, the amount of light when each sheet is transferred is compared to the reference. In the case of multiple feed, the amount of light passing through a sheet is smaller than when only a normal one sheet is transferred. Therefore, when the light-receiving amount by the light-receiving element is lowered, it is detected that the multiple feed has occurred.

Incidentally, the plurality of sheets to be transferred may include, in addition to a blank sheet, an image-formed sheet (so-called pre-printed sheet) on which a predetermined image has been previously formed and also image-formed sheets on which predetermined images different from each other are formed.

When the image-formed sheet is included in the sheets to be transferred, the light-receiving amount by the light-receiving element is lowered due to difference in display colors between sheets being transferred. As a result, there is such a problem that even if the multiple feed has not occurred, it may be erroneously detected.

A threshold value of the light-receiving amount for detecting the multiple feed is previously acquired for each image data corresponding to each sheet and, then, the threshold value is read out to detect the multiple feed while the each sheet is being transferred. However, switching the threshold value for each sheet may cause a problem of cumbersome processing.

SUMMARY

The present invention has been conducted in consideration of the above described situation, and aims to provide the conveyance control device capable of reducing erroneous detections of the multiple feed with simple processing even when the image-formed sheet is included in the sheets to be transferred.

Means to solve the Problem

In order to attain the above described purpose, a first feature of the conveyance control device according to the present invention is that the conveyance control device controlling conveyance of a plurality of sheets including an image-formed sheet includes an obtaining unit configured to obtain display image data indicating a display image of each of the plurality of sheets; a region-specifying unit configured to specify common color regions having a common display color on the plurality of sheets based on the display image data; and a multiple feed detector configured to detect multiple feed of the sheets based on a light-receiving amount of light irradiated onto the common color regions, wherein the display image data indicating a display image of the image-formed sheet includes predetermined image data indicating a predetermined image to be previously formed and sheet image data indicating a sheet image displayed in a sheet color of the sheet.

BRIEF DESCRIPTION OF DRAWINGS

The invention will now be described with reference to the accompanying drawings wherein.

DETAILED DESCRIPTION

Hereinafter, with reference to figures, an embodiment of the present invention will be described in detail.

The embodiment described below illustrates devices, for example, for embodying technical ideas of this invention, and the technical ideas thereof do not specify arrangement of respective components and the like to that described below. The technical ideas of this invention can be modified in various ways in claims.

First Embodiment

<Configuration of Image Forming Apparatus>

Figure 1:
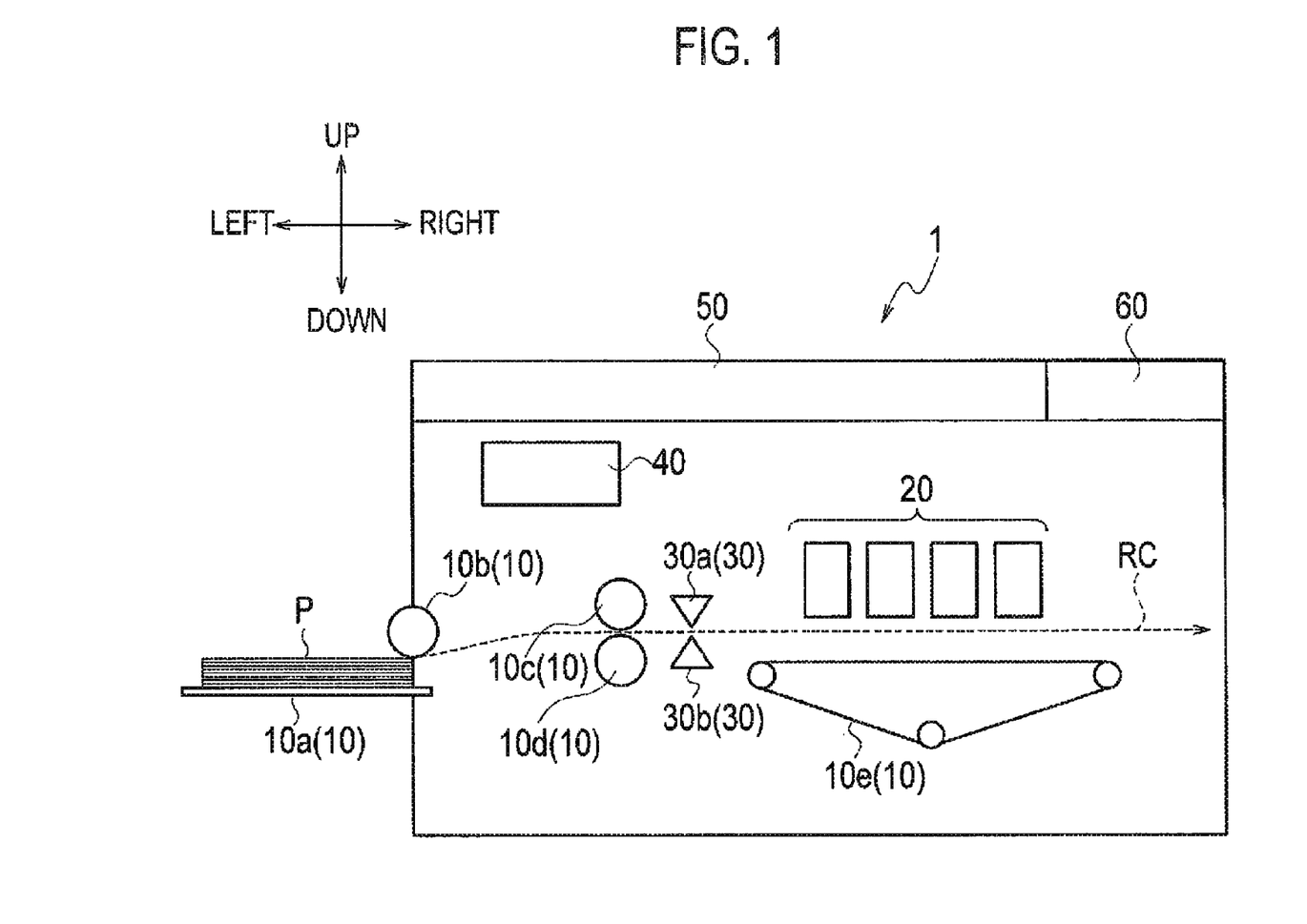
FIG. 1 is a schematic configuration diagram of an image forming apparatus according to a first embodiment of the present invention.

FIG. 1 is a schematic configuration diagram illustrating a configuration of an Image forming apparatus 1 including a conveyance control device according to a first embodiment of the present invention.

In the descriptions below, as illustrated in FIG. 1, up/down and right/left illustrated in FIG. 1 are regarded as up/down and right and left directions. Further, a passage indicated with a broken line in FIG. 1 is a transfer passage RC for transferring a sheet P that is a print medium, and a direction from left to right is a transfer direction. An upstream and a downstream described below mean an upstream and a downstream in the transfer passage RC of the sheet.

The image forming apparatus 1 includes a feeding-paper/conveyance unit 10, an ink-jet head unit 20, a sheet sensor unit 30, a scanning unit 50, and an operation panel unit 60.

The feeding-paper/conveyance unit 10 feeds and transfers a sheet P along the transfer passage RC. The feeding-paper/conveyance unit 10 includes a paper feed tray 10a, a paper feed roller 10b, registration rollers 10c and 10d, and a transfer belt 10e.

The paper feed tray 10a loads the sheet P used for printing.

The paper feed roller 10b picks up each one sheet P loaded on the paper feed tray 10a and transfers it to the registration rollers 10c and 10d. The paper feed roller 10b is arranged at an upper side of the paper feed tray 10a. The paper feed roller 10b is rotated and driven by a motor (not illustrated).

The registration rollers 10c and 10d once stop the sheet P transferred by the paper feed roller 10b and, then, transfer the sheet P to the transfer belt 10e with the sheet P nipped (held). The registration rollers 10c and 10d are arranged at the downstream side of the paper feed roller 10b. The registration rollers 10c and 10d are rotated and driven by a motor (not illustrated).

The transfer belt 10e is a circular belt hung across a plurality of rollers. The transfer belt 10e is formed with a number of belt holes (not illustrated) for absorbing and holding the sheet P. The transfer belt 10e absorbs and holds the sheet P with an absorbing force generated in the belt hole by driving of a fan (not illustrated). The transfer belt 10e is rotated by driving of the plurality of rollers to transfer the absorbed and held sheet P along the transfer passage RC.

The ink-jet head unit 20 includes a plurality of ink jet heads in a line type with a plurality of nozzles arranged in a direction (front and back direction) substantially orthogonal to a transfer direction of the sheet P. The ink-jet head unit 20 is arranged above the transfer belt 10e. The ink jet head unit 20 discharges ink from the ink jet head onto the sheet P transferred by the transfer belt 10e to print an image.

The sheet sensor unit 30 is used to detect the multiple feed of the sheets P being transferred. The sheet sensor unit 30 is arranged between the registration rollers 10e and 10d and the transfer belt 10e. The sheet sensor unit 30 includes a light-emitting unit 30a and a light-receiving unit 30b.

The light-emitting unit 30a is arranged above the transfer passage RC at a predetermined position between the registration rollers 10e and 10d and the transfer belt 10e. The light-emitting unit 30a emits light downward toward the transfer passage RC. The light-emitting unit 30a irradiates the sheet P with the light at a predetermined pitch (e.g., 5 mm) during conveyance of the sheet P. The light-emitting unit 30a includes the light-emitting element such as LED. The light-emitting unit 30a emits the light at the predetermined pitch toward one or both of transfer direction and sheet width direction of the sheet P.

The light-receiving unit 30b receives the light emitted from the light-emitting unit 30a and outputs a signal indicating the light-receiving amount to a main body controller 40. The light-receiving unit 30b is arranged to face the light-emitting unit 30a across the transfer passage RC. The light-receiving unit 30b receives each light emitted from the light-emitting unit 30a at the predetermined pitch. When the sheet P exists between the light-emitting unit 30a and the light-receiving unit 30b after being transferred, a part of light passing through the sheet P after emitted from the light-emitting unit 30a is received by the light-receiving unit 30b.

The main body controller 40 controls operations of respective units of the image forming apparatus 1. The main body controller 40 includes CPU, RAM, ROM, a hard disk, and the like. Note that a detailed configuration of the main body controller 40 will be described below.

The scanning unit 50 reads out a display image to be printed on the sheet P. The scanning unit 50 generates display image data indicating the read out display image and stores it in a storage unit 430 (refer to FIG. 2) of the main body controller 40. According to the embodiment, before printing is performed on the sheet P, the scanning unit 50 generates the display image data indicating a display image of each of the plurality of sheets P loaded on the paper feed tray 10a, and stores it in the storage unit 430 of the main body controller 40.

The operation panel unit 60 receives a user's input operation and, then, displays various kinds of information and the like. The operation panel unit 60 includes an input unit having operation buttons, a touch panel, and the like, for users to perform various kinds of input operations, and a display unit including a liquid display panel or the like displaying various kinds of information (both are not illustrated).

<Configuration of Main Body Controller>

Figure 2:
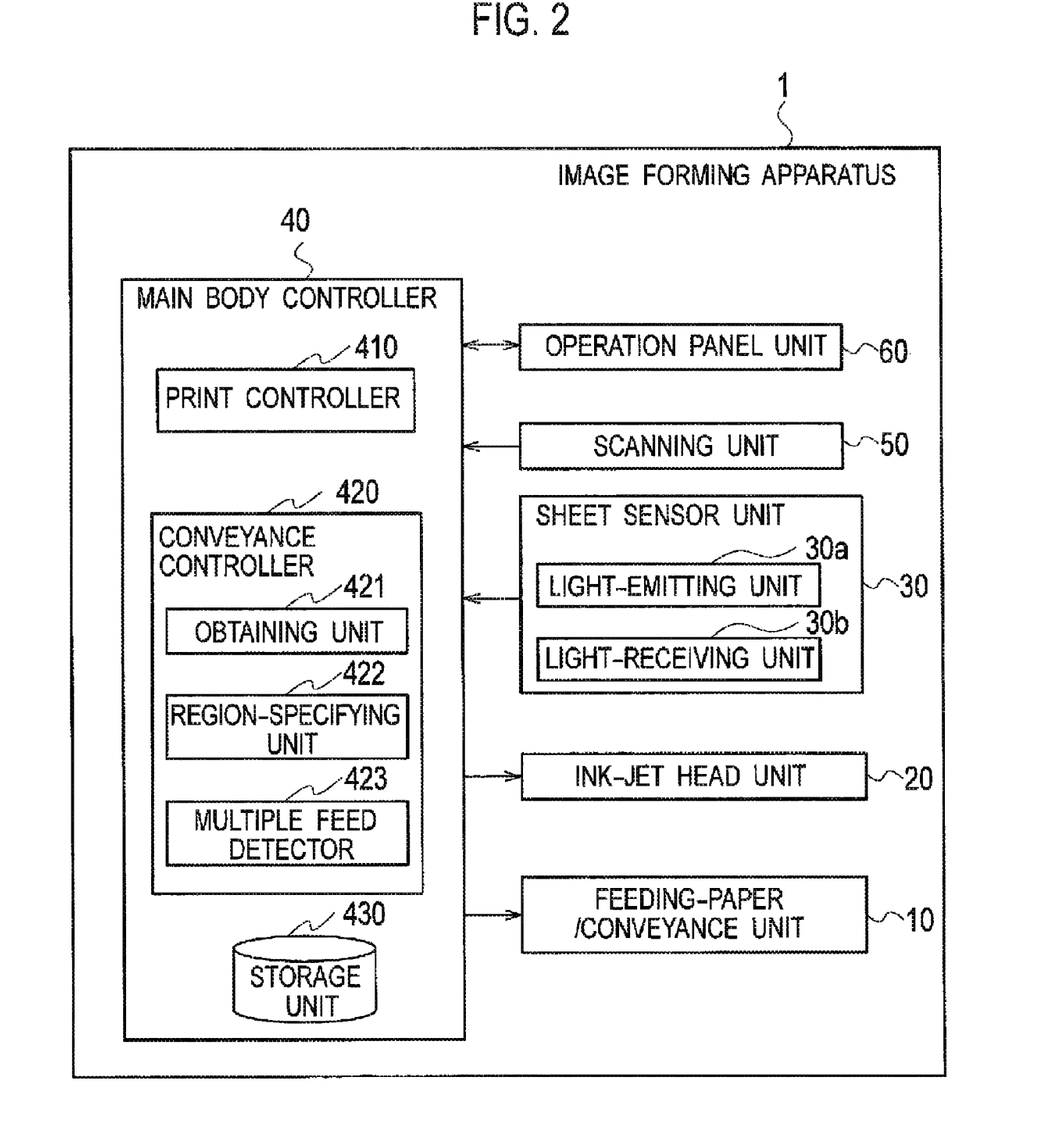
FIG. 2 is a block diagram illustrating functions of the image forming apparatus according to the first embodiment of the present invention.

A. configuration of the main body controller 40 will be specifically described below FIG. 2 is a block diagram illustrating functions of the image forming apparatus 1.

As illustrated in FIG. 2, the main body controller 40 includes a print controller 410, a conveyance controller 420, and a storage unit 430.

The print controller 410 controls the ink-jet head unit 20 to execute print processing for printing an image on the sheet P.

The conveyance controller 420 controls the feeding-paper/conveyance unit 10 to control the conveyance of the plurality of sheets P. According to the embodiment of the present invention, the conveyance controller 420 is included in the conveyance control device.

The conveyance controller 420 includes an obtaining unit 421, a region-specifying unit 422, and a multiple feed detector 423.

The obtaining unit 421 obtains the display image data indicating the display image of each of the plurality of sheets P. Specifically, the obtaining unit 421 obtains the display image data stored in the storage unit 430. The display image means an image printed on a whole sheet.

The region-specifying unit 422 specifies common color regions having a common display color in the plurality of sheets P based on the display image data. Specifically, with reference to the display image data of each of the plurality of sheets P, the region-specifying unit 422 compares pixel values of pixels existing at same positions in the display image data of the plurality of sheets P.

For example, when the pixel value is expressed by an RGB value, with reference to the display image data of each of the plurality of sheets P, the region-specifying unit 422 compares the RGB values of the pixels existing at the same positions in the display image data of the plurality of sheets P. The region-specifying unit 422 specifies the pixels having difference between R values, that between G values, and that between B values of predetermined threshold values or less. The region-specifying unit 422 compares the differences between the RGB values of the pixels on the whole sheet to specify a region including the pixel having the predetermined threshold value or less as the common color region.

The multiple feed detector 423 obtains a signal indicating the light-receiving amount of the light emitted onto the sheet P during the conveyance of the sheet P. The multiple feed detector 423 detects the multiple feed of the sheets P based on the light-receiving amount of the light emitted to the common color region. The multiple feed detector 423 displays an error on the operation panel unit 60 when detecting the multiple feed.

The storage unit 430 stores various kinds of information to be used for processing of the image forming apparatus 1. The storage unit 43( )includes devices capable of storing the information such as a hard disk and a memory. The information stored in the storage unit 430 is referred by each unit in the main body controller 40. According to the embodiment, the storage unit 430 stores the display image data of each of the plurality of sheets P.

<Operations of Image Forming Apparatus>

Figure 3:
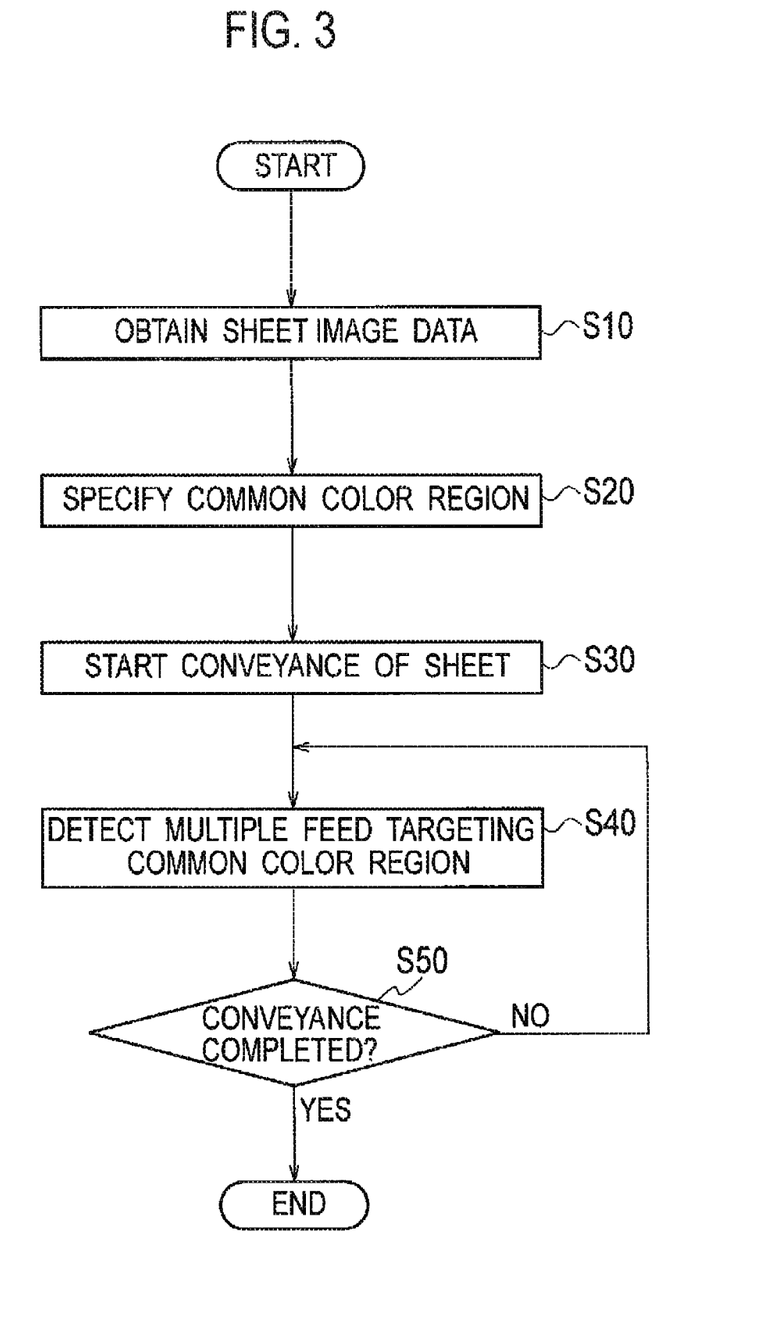
FIG. 3 is a flowchart illustrating operations of the image forming apparatus according to the first embodiment of the present invention.

Subsequently, operations of the image forming apparatus 1 will be described. Specifically, the operations for detecting the multiple feed of the sheets P when the image forming apparatus 1 transfers the sheet P will be described. FIG. 3 is a flowchart illustrating the operations of the image forming apparatus 1.

Herein, it is assumed that, since the plurality of sheets P being transferred by the image forming apparatus 1 includes an image-formed Sheet on which a predetermined image is formed, a sheet having a different display image is included.

First, in step S10, in the image forming apparatus 1, before the conveyance of the sheet P is started, the obtaining unit 421 obtains the display image data indicating the display image of each of the plurality of sheets P. Specifically, the obtaining unit 421 obtains the display image data of each of the plurality of sheets P from the storage unit 430.

In step S20, the region-specifying unit 422 specifies the common color regions having the common display color in the plurality of sheets P based on the display image data.

Herein, the plurality of sheets P includes the image-formed sheet and therefore includes the sheet having the different display image. In this case, as described below, first and second cases are expected. Hereinafter, with reference to FIGS. 4A to 4C, and FIGS. 5A to 5C, in the first and second cases, the operation of the region-specifying unit 422 for specifying the common color regions will be described. Note that, in FIGS. 4A to 4C, and FIGS. 5A to 5C, a transfer direction of the sheet P is indicated as a Y direction, and a sheet width direction orthogonal to the Y direction (front and back direction in FIG. 1) is indicated as an X direction.

In the first case, the plurality of sheets P includes an image-unformed sheet on which no image is formed (e.g., blank sheet or color Sheet), and the image-formed sheet.

Figure 4A:
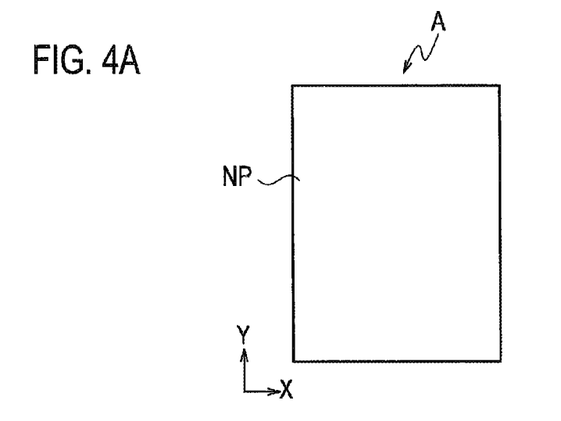
FIG. 4A illustrates an example of a display image displayed on a sheet.
Figure 4B:
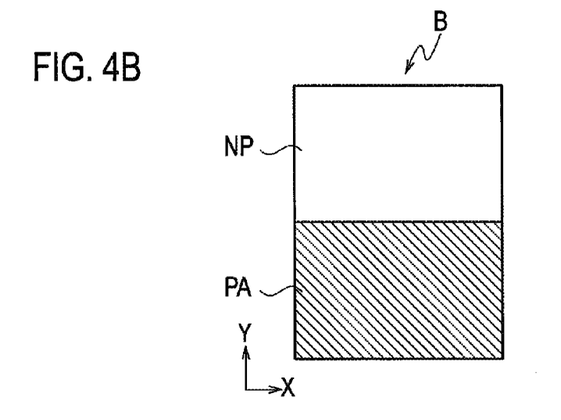
FIG. 4B illustrates an example of a display image displayed on a sheet.

In the first case, a display image A of the image-unformed sheet includes, as illustrated in FIG. 4A, a sheet image NP expressed in a sheet color of the sheet P. Therefore, the display image data includes only the sheet image data indicating the sheet image NP. Further, a display image B of the image-formed Sheet includes, as illustrated in FIG. 4B, a predetermined image PA and the sheet image NP. Therefore, the display image data indicating the display image B includes predetermined image data indicating the predetermined image PA to be previously formed on the sheet P and the sheet image data indicating the sheet image NP expressed in the sheet color of the sheet P.

Figure 4C:
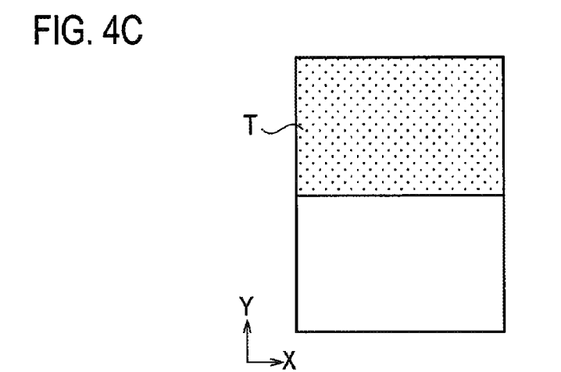
FIG. 4C illustrates an example of a common color region specified on a sheet.

In the first case, as illustrated in FIG. 4C, the region-specifying unit 422 compares the display image data indicating the display image A of the image-unformed sheet to the display image data indicating the display image B of the image-formed sheet, so as to specify a common color region T having the common display color in a region of the sheet image NP.

On the other side, in the second case, all the plurality of sheets P are the image formed-sheets. Specifically, in the second case, the plurality of sheets P includes a first image-formed sheet on which the predetermined image is formed and a second image-formed sheet on which the predetermined image is formed.

Figure 5A:
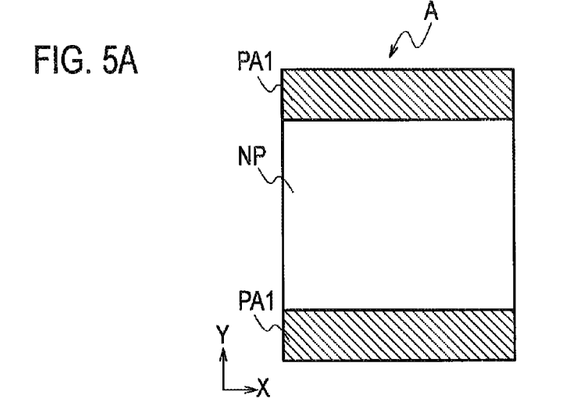
FIG. 5A illustrates an example of a display image displayed on a sheet.
Figure 5B:
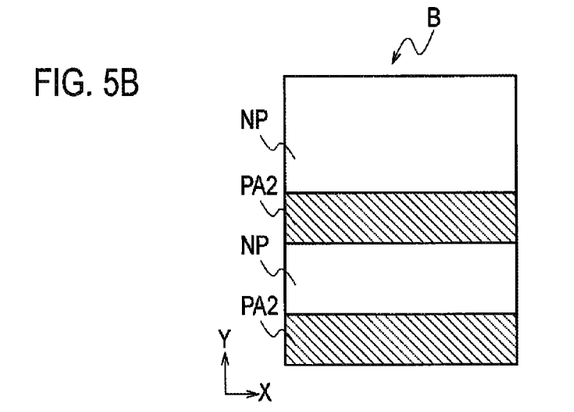
FIG. 5B illustrates an example of a display image displayed on a sheet.

The display image A of the first image-formed sheet includes, as illustrated in FIG. 5A, the first predetermined image PA1 and the sheet image NP. Therefore, the display image data indicating the display image A of the first image-formed sheet includes the predetermined image data indicating the first predetermined image PA1 and the sheet image data indicating the sheet image NP. Further, the display image B of the second image-formed sheet includes, as illustrated in FIG. 5B, the second predetermined image PA2 and the sheet image NP. Therefore, the display image data indicating the display image B of the second image-formed sheet includes the predetermined image data indicating the second predetermined image PA2 and the sheet image data indicating the sheet image NP.

Figure 5C:
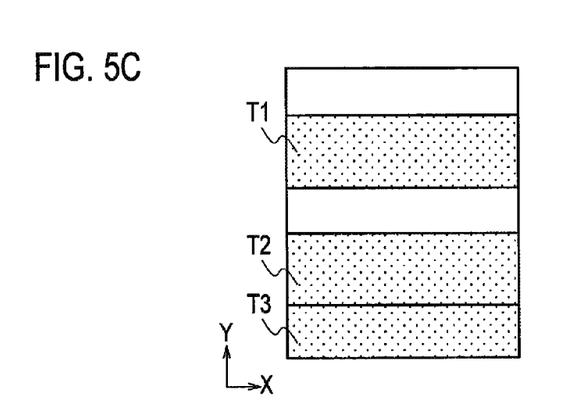
FIG. 5C illustrates an example of a common color region specified on a sheet.

In the second case, as illustrated in FIG. 5C, the region-specifying unit 422 compares the display image data indicating the display image A of the first image-formed sheet to the display image data indicating the display image B of the second image-formed sheet, so as to specify common color regions T1 and T2 having the common display color in the region of the sheet image NP and a common color region T3 having the common display color in the regions of the first predetermined image PA1 and the second predetermined image PA2 as a common color region T.

In step S30, in the image forming apparatus 1, the feeding-paper/conveyance unit 10 starts the conveyance of the sheet P.

In step S40, the multiple feed detector 423 obtains a signal indicating the light-receiving amount of the light emitted to the common color region T during the conveyance of the sheet P. Then, the multiple feed detector 423 detects the multiple feed of the sheets P based on the light-receiving amount of the light emitted to the common color region T specified by the region-specifying unit 422.

Specifically, the multiple feed detector 423 sets the light-receiving amount of the light emitted to the common color region T of the sheet P to be transferred at first as a reference light-receiving amount. Then, the multiple feed detector 423 compares the light-receiving amount of the light emitted to the common color region T of the sheet P transferred secondarily or later to the reference light-receiving amount, so as to detect the multiple feed.

For example, when difference between the light-receiving amount of the sheet P transferred secondarily or later and the reference light-receiving amount is the predetermined threshold value or less, the multiple feed detector 423 detects that the multiple feed of the sheets P transferred secondarily or later has occurred.

Further, the multiple feed detector 423 may control the sheet sensor unit 30 during the conveyance of the sheet P, and irradiates only the common color region T with the light, so as to obtain only the signal indicating the light-receiving amount of the light emitted to the common color region. T. Further, the multiple feed detector 423, after obtaining the signal indicating the light-receiving amount of the light sequentially emitted in the transfer direction of the sheet P, may extract only the signal indicating the light-receiving amount of the light emitted to the common color region I.

In step S50, when the feeding-paper/conveyance unit 10 has completed the conveyance of the sheet P (YES in step S50), the image forming apparatus 1 ends the operation. On the other hand, when the feeding-paper/conveyance unit 10 has not completed the conveyance of the sheet P (NO in step S50), the operation of step S40 will be repeatedly performed.

<Operation and Effect>

As described above, in the image forming apparatus I according to the first embodiment of the present invention, on the basis of the display image data of the sheet P, the region-specifying unit 422 specifies the common color region T having the common display color in the plurality of sheets P. On the basis of the light-receiving amount of the light emitted to the common color region T, the multiple feed detector 423 detects the multiple feed of the sheets P. With this arrangement, even if the image-formed sheet is included in the plurality of sheets P, depending on the light-receiving amount of the light emitted to the common color region T, the multiple feed of the sheets P can be detected. Therefore, lowering of the light-receiving amount due to difference in the display colors can be avoided.

Herein, as a method of detecting the multiple feed when the image-formed sheet is included in the plurality of sheets P, such a method is considered that previously acquires a threshold value of the light-receiving amount for detecting the multiple feed for each image data, and reads out the threshold value during the conveyance to detect the multiple feed. However, in this case, since the threshold value is switched for each sheet P, detection processing becomes cumbersome.

On the other hand, the image forming apparatus I according to the first embodiment of the present invention detects the multiple feed of the sheets P depending on the light-receiving amount of the light emitted to the common color region T. In other words, even if the different threshold value of the light-receiving amount is not defined for each sheet P, the multiple feed can be detected depending on the common threshold value of the light-receiving amount for each sheet. Therefore, the detection processing is facilitated. As described above, even when the image-formed sheet is included in the plurality of sheets P being transferred, the erroneous detection of the multiple feed can be reduced by simple processing.

Further, in the image forming apparatus I according to the first embodiment of the present invention, the display image data indicating the display image of the image-formed sheet includes the predetermined image data indicating the predetermined image to be previously formed and the sheet image data indicating the sheet image expressed in the sheet color. With this arrangement, the region-specifying unit 422 can specify the common color region T as targeting both the region in which the predetermined image is formed and the region in which the sheet image expressed in the sheet color is formed in the plurality of sheets P including the image-formed sheet. Therefore, compared to a case where only either one of the regions is targeted, the common color region T can be more widely specified. Thus, since the common color region T for detecting the multiple feed can be more widely secured, compared to a case where the common color region T is small, the number of samples of the light-receiving amount to be detected can be increased. As a result, detection accuracy of the multiple feed can be improved.

Other Embodiment of the Present Invention

As described above, the present invention is described in detail using the aforementioned embodiment, but, for those skilled in the art, it is obvious that the present invention is not limited to the embodiment described above in the specification.

For example, the aforementioned embodiment describes a case where the image forming apparatus 1 is a printing apparatus of an ink jet type as an example, but it is not limited to the printing apparatus of an ink jet type. The image forming apparatus 1 may be a stencil printing apparatus for printing by a stencil printing method, and also a toner printing apparatus for printing by an electro-photographic method (so-called toner method).

Further, for example, the aforementioned embodiment describes a case where the conveyance control device is included in the image forming apparatus 1 as an example, but it is not limited to the image forming apparatus 1. The conveyance control device can be adopted to various types of apparatuses for transferring the sheets.

Further, for example, the aforementioned embodiment describes that the light-emitting unit 30a is arranged above the transfer passage RC, and the light-receiving unit 30b is arranged below the transfer passage RC, but the arrangement is not limited to that described above. The light-emitting unit 30a and the light-receiving unit 30b may be arranged to face each other across the transfer passage RC so that the light emitted from the light-emitting unit 30a passes through a surface of the sheet P being transferred and, then, is received by the light-receiving unit 30b.

Further, for example, according to the aforementioned embodiment, the light-receiving unit 30b is arranged to face the light-emitting unit 30a across the transfer passage RC, but may be arranged at the same side as the light-emitting unit 30a. In this case, the light-receiving unit 30b, upon receiving reflection light of the light emitted from the light-emitting unit 30a, outputs a signal indicating the light-receiving amount.

Further, for example, according to the aforementioned embodiment, the region-specifying unit 422 specifies the common color region T based on the display image data indicating the display image to be printed on one surface of the sheet P. However, on the basis of the display image data indicating the display image to be printed on both surfaces of the sheet P, the region-specifying unit 422 may specify the common color region T.

In this case, the first common color region is specified based on the display image data indicating the display image to be printed on a front surface and, then, the second common color region is specified based on the display image data indicating the display image to be printed on a back surface. Herein, a coordinate system of the first common color region and that of the second common color region are different from each other between the front surface and the back surface. Therefore, the region-specifying unit 422 makes both coordinate systems in common. Specifically, the region-specifying unit 422 converts the coordinate of the second common color region (or first common color region) by a mirror conversion having a predetermined axis (e.g., the Y axis illustrated in FIGS. 4A, 4B, and 4C) as a reference. The region-specifying unit 422 specifies an overlapping region between the first common color region and the second common color region after being converted (or, overlapping region between the second common color region and the first common color region after being converted) as the common color region for detecting the multiple feed.

As described above, the present invention is not limited to the above described embodiment as it is, but the components can be modified and embodied within the scope not deviating from its gist in a practical stage. Further, by appropriate combination of plurality of components disclosed in the embodiment, various kinds of inventions can be formed. For example, some components may be deleted from all components described in the embodiment.

Further, for example, each described function and processing can be implemented by one or more processing circuits. The processing circuit includes a processer and an electric circuit that have been programmed and, further, devices such as an integrated circuit (ASIC) for a specific application, and circuit components arranged to perform described functions.

The present application claims the priority based ©n the Japanese Patent Application No. 2016-015162 filed on 29 Jan. 2016, and all contents of the present application is incorporated into the present specification as reference.

REFERENCE SIGNS LIST

1 image forming apparatus
10 feeding-paper/conveyance unit
10*a* paper feed tray
10*b* paper feed roller
10*c*, 10*d* registration roller
10*e* transfer belt
20 ink jet head unit
30 sheet sensor unit
30*a* light-emitting unit
30*b* light-receiving unit
40 main body controller
50 scanning unit
60 operation panel unit
410 print controller
420 conveyance controller
421 obtaining unit
422 region-specifying unit
423 multiple feed detector
430 storage unit

What is claimed is;:

1. A conveyance control device controlling conveyance of a plurality of sheets including an image-formed sheet, comprising:
    an obtaining unit configured to obtain display image data indicating a display image of each of the plurality of sheets;
    a region-specifying unit configured to specify common color regions having a common display color on the plurality of sheets based on the display image data; and
    a multiple feed detector configured to detect multiple feed of the sheets based on a light-receiving amount of light irradiated onto the common color regions,
    wherein the display image data indicating a display image of the image-formed sheet includes predetermined image data indicating a predetermined image to be previously formed and sheet image data indicating a sheet image displayed in a sheet color of the sheet.

* * * * *